United States Patent
Arai et al.

(10) Patent No.: US 6,519,229 B1
(45) Date of Patent: Feb. 11, 2003

(54) TRANSMISSION PATH INTERFACE APPARATUS

(75) Inventors: Koji Arai, Kawasaki (JP); Gen Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/175,272

(22) Filed: Oct. 20, 1998

(30) Foreign Application Priority Data

Feb. 27, 1998 (JP) .......................................... 10-047374

(51) Int. Cl.[7] .............................................. H04L 12/26
(52) U.S. Cl. ........................ 370/249; 370/347; 370/445
(58) Field of Search ................................ 370/338, 349, 370/445–448, 461–462, 249, 347

(56) References Cited

U.S. PATENT DOCUMENTS

| | | | |
|---|---|---|---|
| 4,701,909 A | * | 10/1987 | Kavehrad et al. |
| 4,706,246 A | * | 11/1987 | Kume |
| 5,379,290 A | * | 1/1995 | Kleijne |

FOREIGN PATENT DOCUMENTS

| | | |
|---|---|---|
| JP | 7-336352 | 12/1995 |
| WO | 97/35404 | 9/1997 |
| WO | 98/12859 | 3/1998 |
| WO | 98/41037 | 9/1998 |
| WO | 98/42148 | 9/1998 |

OTHER PUBLICATIONS

U.S. patent application Ser. No. 09/168,449, Nakagawa, et al., filed Oct. 8, 1998, Subscriber Radio Access System.

* cited by examiner

*Primary Examiner*—Melvin Marcelo
*Assistant Examiner*—Inder Pal Mehra
(74) *Attorney, Agent, or Firm*—Katten Muchin Zavis Rosenman

(57) ABSTRACT

A transmission path interface apparatus compatible with a CSMA mode capable of responding to a fault occurring in a transmission path flexibly and at a high speed, including a transmission unit for holding serial transmission information and transmitting a frame modulated by both of the transmission information and a preamble to a CSMA mode transmission path; a reception unit for taking out a loopback frame transmitted by an opposing node in accordance with that frame, restoring the transmission information contained in this, and holding the same; a collision decision unit for determining a correlation between transmission information held by the transmission unit and the reception unit and notifying a result of this to an information source of transmission information; and a collision decision acceleration unit for comparing an elapsed time from a timing when the information source gave the transmission information to the transmission unit to a timing when the transmission information contained in the loopback frame is restored and a threshold value indicating the maximum time of a delay allowed with respect to the transmission of the frame containing the following transmission information and notifying the information source that the former exceeds the latter.

12 Claims, 8 Drawing Sheets

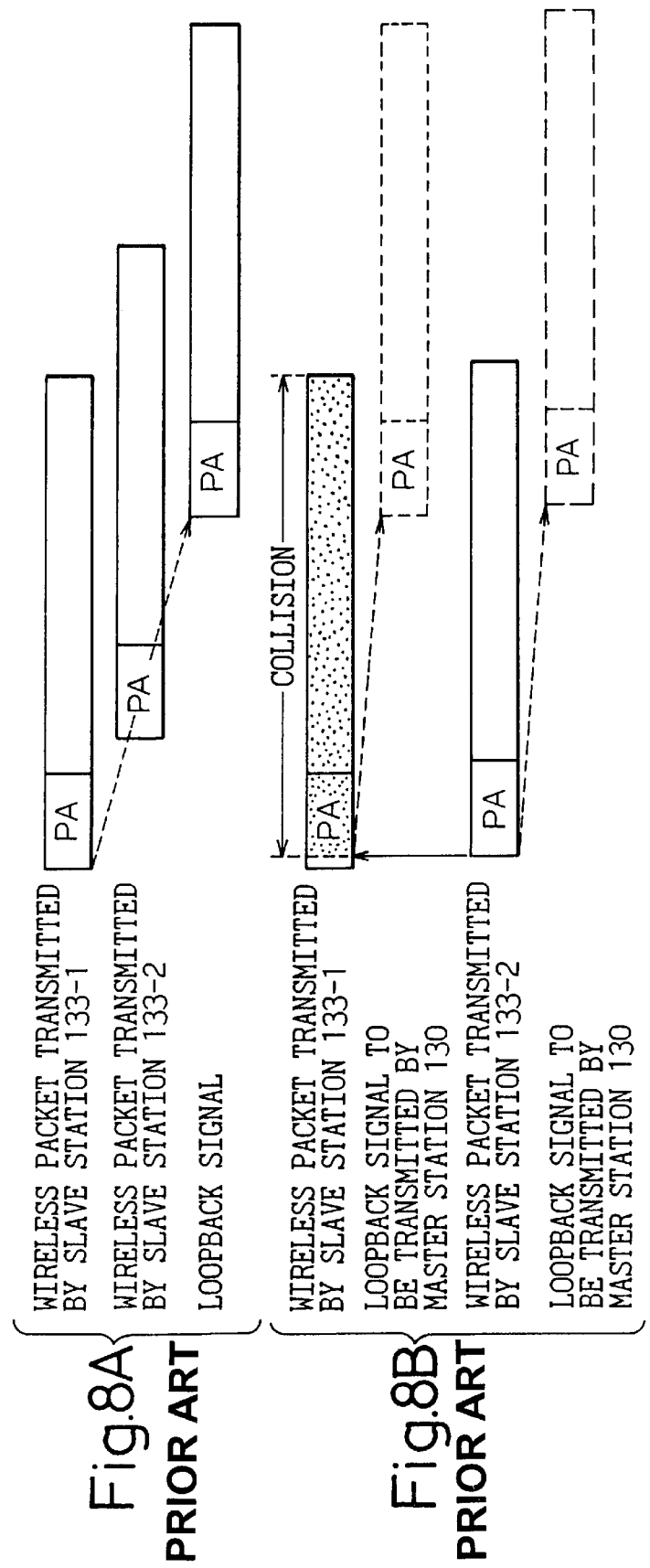

TRANSMISSION PATH INTERFACE APPARATUS

BACKGROUND OF THE INVENTION

1. Field of the Invention

The present invention relates to a transmission path interface apparatus for interfacing between an information terminal giving transmission information to be sent and a transmission path compatible to a carrier sense multiple access (CSMA) mode or carrier sense multiple access with collision detection (CSMA/CD) mode and matching the transmission mode of the transmission path and the transmission information.

In the CSMA/CD mode, access to the transmission path is achieved under communication controls distributed to individual nodes. This enables simplification and standardization of the configuration of the hardware in a flexible manner and reduces the possibility of the spread of a failure occurring in any node to the other nodes, therefore has been frequently applied to bus like local area networks (LANs).

Further, in recent years, in addition to the technologies for prevention and correction of transmission error, digital modulation and demodulation technology compatible with these techniques have been established, therefore wireless LANs using not only radio waves, but also infrared rays etc. as carriers have been commercialized and are spreading as core elements of office automation systems.

2. Description of the Related Art

As will be explained in detail later by using the drawings, in a wireless LAN of the related art comprised of a master station, a wireless transmission path, a plurality of slave stations connected to the master station via the wireless transmission path, and personal computers coupled to the slave stations, when wireless packets are sent by a plurality of slave stations in parallel to an uplink of the wireless transmission path, the master station cannot normally receive the wireless preambles contained in part or all of these wireless packets. For this reason, no loopback signals corresponding to the related wireless packets are sent to a downlink of the wireless transmission path.

In such a case, any of the plurality of personal computers which is standing by for confirming the loopback signal must suspend transmission of the following identification information and transmission information over an interval T mentioned later. In this case, the interval T generally becomes longer than a sum of the time required for the processing to be carried out in the master station and the time required for propagation in the uplink and downlink of the wireless transmission path and becomes a value equal to or longer than a time corresponding to the maximum length of the wireless packet. Therefore, the possibility of reduction of the transmission efficiency was high.

Further, the transmission efficiency is more conspicuously lowered the larger the number of slave stations attempting to send wireless packets in parallel on uplinks of the wireless transmission path, therefore technology capable of maintaining the transmission efficiency high even if the number of slave stations is increased is in demand.

SUMMARY OF THE INVENTION

Therefore, an object of the present invention is to provide a transmission path interface apparatus capable of identifying at a high speed and with a high accuracy that the loopback signal cannot be given.

To attain the above object, a transmission path interface apparatus according to the present invention is constituted by providing a transmitting means for holding serial transmission information and transmitting a frame modulated by both the transmission information and a preamble to a CSMA mode transmission path; a receiving means for taking out a loopback frame transmitted by an opposing node in accordance with that frame, restoring the transmission information contained in this, and holding the same; a collision decision means for determining a correlation between transmission information held by the transmitting means and the receiving means and notifying a result of this to a source of transmission information; and a collision decision accelerating means for comparing an elapsed time from a timing when the information source gave the transmission information to the transmitting means to a timing when the transmission information contained in the loopback frame is restored with a threshold value indicating the maximum time of a delay allowed with respect to the transmission of the frame containing the following transmission information and giving notification that the former exceeds the latter to this information source.

By this, a transmission path interface apparatus compatible with the CSMA mode capable of responding to a failure occurring in the transmission path flexibly and at a high speed is realized.

BRIEF DESCRIPTION OF THE DRAWINGS

The above object and features of the present invention will be more apparent from the following description of the preferred embodiments given with reference to the accompanying drawings, wherein:

FIGS. 8A and 8B are views illustrating the operation and problems of the related art.

DESCRIPTION OF THE PREFERRED EMBODIMENTS

Before describing the embodiments of the present invention, the related art and the disadvantages therein will be described with reference to the related figures.

Figure 7:
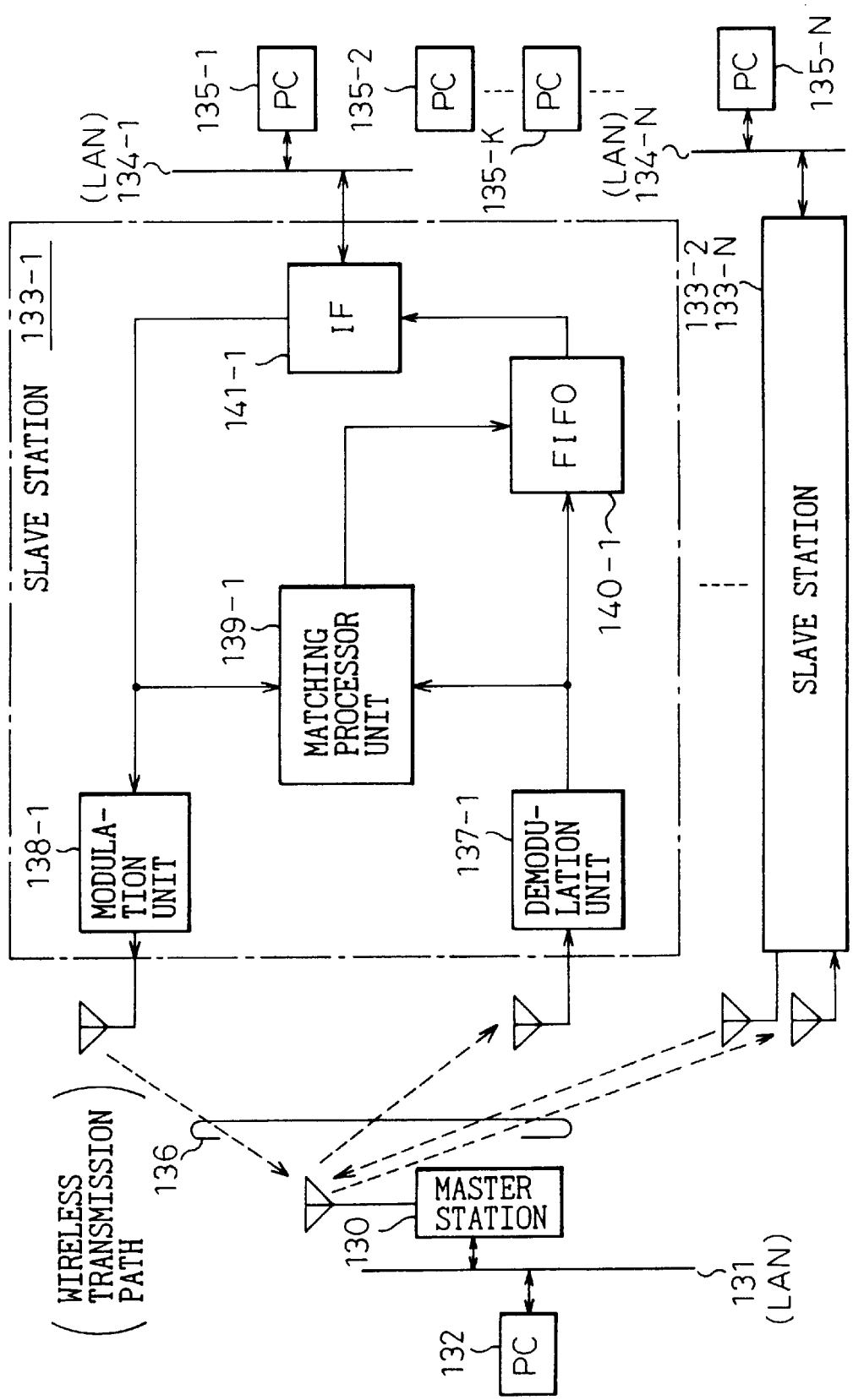
FIG. 7 is a view of an example of the configuration: of a wireless LAN of the related art.

FIG. 7 is a view of an example of the configuration of a wireless LAN of the related art.

In the figure, a master station 130 is connected to: a communication port of a personal computer (PC) 132 via a LAN 131, while a plurality of slave stations 133-1 to 133-N are respectively connected to communication ports of personal computers 135-1 to 135-N via LANs 134-1 to 134-N. These slave stations 133-1 to 133-N and the master station 130 are opposing to each other via a full duplex mode wireless transmission path 136.

The slave station 133-1 is constituted by a demodulation unit 137-1 and a modulation unit 138-1 linked with the wireless transmission path 136 via an aerial system, a matching processor unit 139-1 with one input which is connected to an output of the demodulation unit 137-1, a first-in first-out (FIFO) 140-1 with one input which is connected to one input of this matching processor unit 139-1 and the output of the demodulation unit 137-1 and with another input which is connected to the output of the matching processor unit 139-1, and an interface unit (IF) 141-1 connected to the LAN 134-1 and arranged between the output of the FIFO 140-1 and both of the input of the modulation unit 138-1 and another input. of the matching processor unit 139-1.

Note that the configurations of the slave stations 133-2 to 133-N are the-same as the configuration of the slave station 133-1, therefore, below,.the same reference numerals added with "2" to "N" as suffixes are given to corresponding constituent elements and overlapping explanations and illustrations are omitted.

In the related art having such a configuration, the personal computer (PC) 135-1 gives identification information indicating a destination in addition to the transmission information to the modulation unit 138-1 via the LAN 134-1 and the interface unit 141-1 when certain transmission information addressed to any of for example the personal computers 135-2 to 135-N (here, for simplification, the personal computer 135-2 is assumed) is transmitted. Together with this, these transmission information and identification information are held in a specific region of a main memory in the personal computer 135-1. The personal computer 135-1 activates a timer of the interval T determined in advance.

The modulation unit 138-1 transforms the transmission information and the identification information given in this way to a packet of a predetermined format (for example with a word length of 64 bytes) and adds a preamble comprised by a specific bit pattern to a header of that packet so as to generate a baseband signal.

Further, the modulation unit 138-1 modulates a predetermined carrier signal by the baseband signal to generate a wireless packet and transmit the wireless packet to the uplink of the wireless transmission path 136.

Note that, below, the part disposed in the header portion of this wireless packet indicating the above preamble will be referred to as a "wireless preamble".

On the other hand, the master station 130 demodulates the wireless packet received via the wireless transmission path 136 to reproduce the baseband signal, pulls in a working point of a built-in analog circuit to a linear region in accordance with the preamble contained in the header portion of the baseband signal, and establishes bit synchronization.

Further, the master station 130 establishes frame synchronization compatible with the predetermined frame format under the bit synchronization so as to restore the transmission information and the identification information contained in the baseband signal and performs processing similar to the processing carried out by the modulation unit 138-1 at the slave station 133-1 to generate a loopback signal containing these transmission information and identification information and having the same format as the wireless packet and transmits the same to the downlink of the wireless transmission path 136.

Further, the master station 130 compares a unique identification information allocated to itself in advance and the identification information restored as explained above. When the two coincide, the restored transmission information is given together with the identification information thereof to the personal computer 132 via the LAN 131. Conversely, when the two do not coincide, in addition to these transmission information and identification information, a wireless packet containing the above preamble and having the same format as the loopback signal (hereinafter referred to as a "relay packet") is generated and sent to the downlink of the wireless transmission path 136.

Note that the personal computer 132 applies certain processing to the transmission information given from the master station 130 via the LAN 131, but this processing is not related to the invention of the present application, so the explanation thereof is omitted here.

In the slave station 133-1, the matching processor unit 139-1 restricts the reading of the FIFO 140-1 at a timing when the transmission information and identification information mentioned above are given to the modulation unit 138-1 via the LAN 134-1 and the interface unit 141-1 (hereinafter such a state will be referred to as a "loopback standby state") and temporarily stores these transmission information and identification information (hereinafter the two will be referred to as "matching reference information" together).

Further, the demodulation unit 137-1 demodulates the loopback signal given via the downlink of the wireless transmission path 136 to generate the baseband signal. By analyzing the baseband signal based on the above frame format, the transmission information and the identification information contained in this loopback signal are restored.

The FIFO 140-1 successively stores the thus restored transmission information and the identification information. The matching processor unit 139-1 compares these transmission information and identification information with the matching reference information mentioned above.

Further, the matching processor unit 139-1 instructs the reading of the transmission information and the identification information stored as mentioned above to the FIFO 140-1 when the result of the comparison is "true". Conversely, when the result of this comparison is "false", the transmission information and the identification information stored in the FIFO 140-1 and the matching reference information are discarded and the restriction on reading of the FIFO 140-1 is released.

The interface unit 141-1 sends the transmission information and the identification information read from the FIFO 140-1 via the LAN 134-1 to the personal computer 135-1.

When the personal computer 135-1 is given these transmission information and identification information via the LAN 134-1, when counting of the timer mentioned above has not been completed at that timing, it compares these information with the transmission information and the identification information held in advance in the specific region of the main memory. Where the two coincide, the counting of this timer is stopped and both of these transmission information and identification information are discarded. Note that the processing to be performed by the personal computer 135-1 when the two are found not to coincide by this comparison will be explained later.

Further, in the one or more of those of the slave stations 133-1 to 133-N not in the loopback standby state (hereinafter, for simplification, indicated by the reference numeral "133-K"), a demodulation unit 137-K demodulates the above relay packet given via the downlink of the wireless transmission path 136 to reproduce the baseband signal. Further, it analyzes the baseband signal based on the similar frame format to restore the transmission information and the identification information contained in this relay packet.

The FIFO 140-K successively stores both of the transmission information and identification information restored in this way. The matching processor unit 139-K compares that identification information with the unique identification information allocated to itself (139-K) in advance.

Further, the matching processor unit 139-K discards the transmission information and identification information stored in the FIFO 140-K when the result of that comparison is "false", but allows the reading of these transmission information and identification information to the FIFO 140-K when the result of this comparison is "true".

The interface unit 141-K sends the transmission information and the identification information read from the FIFO 140-K in this way to the personal computer 135-K via the LAN 134-K.

Note that when the personal computer 135-1 is given some transmission information and identification information via the LAN 134-1, when the counting of the timer mentioned above has not been completed at that timing, it compares these information with the transmission information and the identification information held in advance in the specific region of the main memory. When the result of the comparison is that the two do not coincide, it performs a communication control based on a predetermined protocol.

Further, the personal computer 135-1 applies predetermined processing to the given transmission information and the identification information via the LAN 134-1 when the counting of the timer is completed or when the timer is never activated.

Note that this processing and the above communication control are not relevant to the present invention, so explanations thereof will be omitted here.

The slave stations 133-1 to 133-N share the uplink of the wireless transmission path 136 and asynchronously transmit the transmission information and the identification information given from the personal computers 135-1 to 135-N to the uplink.

Namely, while the slave station 133-1 transmits a certain wireless packet, the slave station 133-2 can transmit another wireless packet delayed from this and in parallel with this. In such a case, even if the master station 130 does not completely receive the wireless preamble PA in the wireless packet which began being transmitted before the other, as shown in FIG. 8A, it can transmit the loopback signal based on the wireless preamble PA so far as, as mentioned above, (1) the working point of the built-in analog circuit can be pulled into the linear region and (2) bit synchronization can be established.

However, when the majority of the wireless preamble PA contained in a first wireless packet transmitted by the slave station 133-1 overlaps a second wireless packet transmitted by the slave station 133-2 on a time axis, the master station 130 cannot normally perform the processings of (1) and (2) mentioned above. As indicated by a dotted line and a broken line in FIG. 8B, these wireless packets or the loopback signal corresponding to the first wireless packet cannot be transmitted.

On the other hand, the personal computers 135-1 and 135-2 activate timers of the interval T as mentioned above when the transmission information and the identification information to be transmitted as the first wireless packet and the second wireless packet are given to the slave stations 133-1 and 133-2 via the LAN 134-1 and 134-2, respectively.

Further, the personal computers 135-1 and 135-2 retransmit the transmission information and the identification information held in the specific memory region of the main memory in advance to the slave stations 133-1 and 133-2 via the LANs 134-1 and 134-2 when recognizing that countings of these timers have been completed, respectively.

Accordingly, the personal computers 135-1 to 135-n can transfer transmission information with the intended personal computers, including the personal computer 132 connected to the master station 130, while sharing the wireless transmission path 136 under a reproducing and relaying operation performed by the master station 130 according to the CSMA/CD mode.

In the above related art, as already mentioned, when wireless packets are sent by a plurality of slave stations among the slave stations 133-1 to 133-N in parallel to an uplink of the wireless transmission path, the master station 130 cannot normally receive the wireless preambles contained in part or all of these wireless packets. For this reason, no loopback signals corresponding to the related wireless packets are sent to a downlink of the wireless transmission path 136.

In such a case, however, as already mentioned, any of personal computers 135-1 to 135-N which is standing by for confirming the loopback signal must forego transmission of the following identification information and transmission information over the interval T. In this case, the interval T generally becomes longer than a sum of the time required for the processing to be carried out in the master station 130 and the time required for propagation in the uplinks and downlinks of the wireless transmission path 136 and becomes a value equal to or longer than a time corresponding to the maximum length of the wireless packet. Therefore, the possibility of reduction of the transmission efficiency was high.

Further, the transmission efficiency is more conspicuously lowered the larger the number of slave stations attempting to send wireless packets in parallel on uplinks of the wireless transmission path 136, therefore technology capable of maintaining the transmission efficiency high even if the number of slave stations is increased is in demand.

The present invention provides a transmission path interface apparatus capable of identifying at a high speed and with a high accuracy that the loopback signal cannot be given. This will be explained in detail below.

Figure 1:
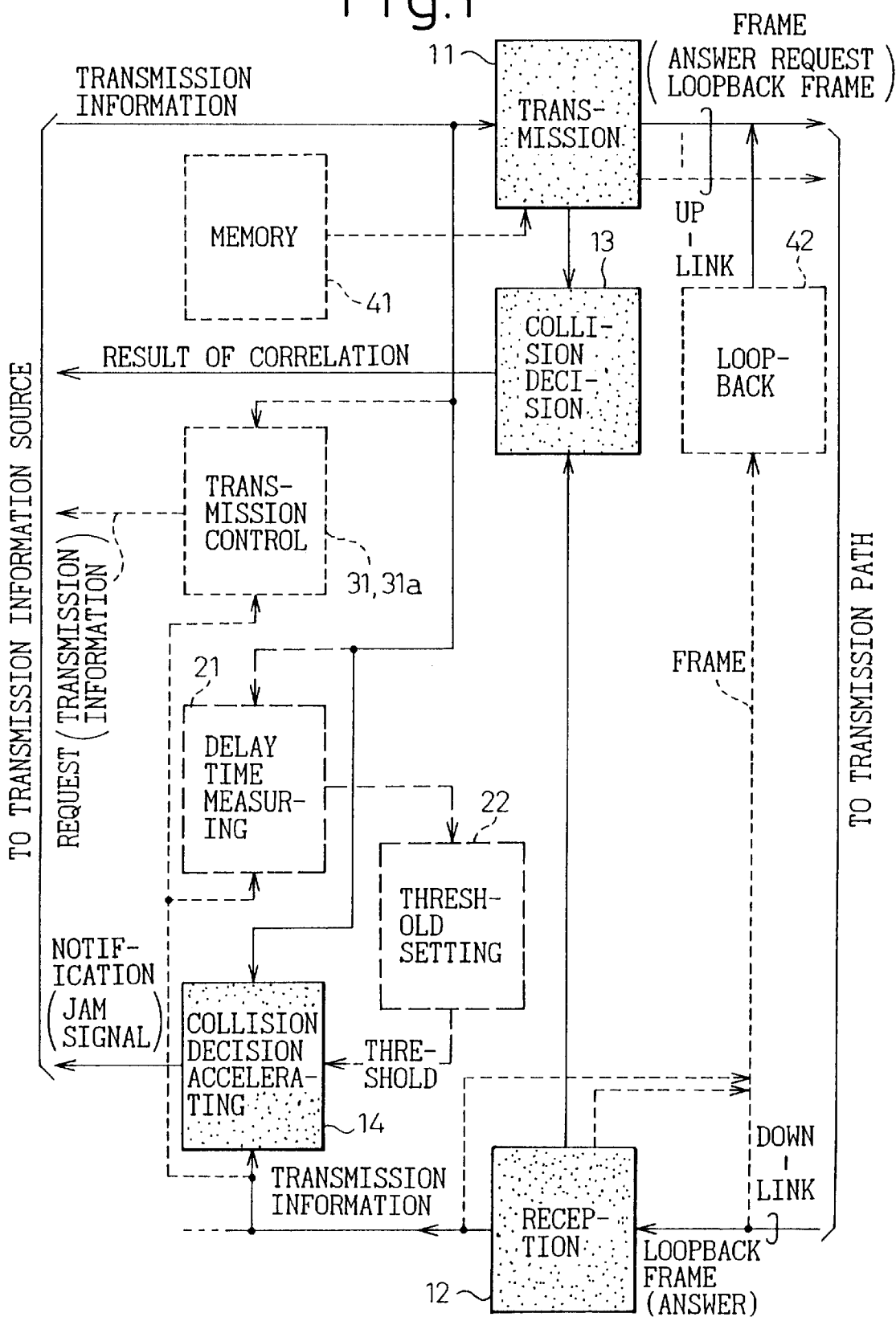
FIG. 1 is a view of a principle configuration block diagram of the present invention.

FIG. 1 is a principle configuration block diagram of the present invention.

a) As shown in the figure, according to a first aspect of the invention, the transmission path interface apparatus is provided with a transmitting means 11 for holding the transmission information given as a serial bit train, generating a frame modulated by a preamble together with that transmission information, and transmitting this frame to a transmission path compatible with a CSMA mode; a receiving means 12 for taking out a loopback frame which is being transmitted by an opposing node via the transmission path in response to a frame which the transmitting means 11 transmitted, restoring the transmission information contained in this loopback frame, and holding the same; and a collision decision means 13 for determining a correlation between transmission information individually held by the transmitting means 11 and the receiving means 12 respectively and notifying a result of this correlation to a source of the transmission information contained in the frame generated by the transmitting means 11. Here, the characteristic feature of the present invention resides in provision of a collision decision accelerating means 14 for comparing an elapsed time from a timing when the information source gave the transmission information to the transmitting means 11 to a timing when the transmission information contained in the loopback frame is restored by the receiving means 12 with a threshold value indicating the maximum time allowed with respect to the transmission of the frame modulated by the following transmission information and notifying the fact that the former exceeds the latter to this information source when the former exceeds the latter.

That is, the transmitting means 11 holds the transmission information given as the serial bit train. The transmitting means 11 generates a frame modulated by the preamble together with that transmission information and transmits this frame to the transmission path compatible with the CSMA mode. Further, the receiving means 12 fetches the loopback frame which is being transmitted by an opposing node via the transmission path in response to a frame which the transmitting means 11 is transmitting and restores and holds the transmission information contained in this loopback frame.

Further, the collision decision means 13 determines the correlation between transmission information individually held by the transmitting means 11 and the receiving means 12 respectively. The result of this correlation is notified to the information source of the transmission information. Accordingly, a plurality of transmission path interface apparatuses judge whether or not collision occurs in the transmission path under the above CSMA and therefore this information source can perform the communication control in accordance with the result of the judgement.

When the preamble and a frame transmitted in parallel by another transmission path interface apparatus collide on the transmission path, the above node cannot normally receive the frame containing that preamble, therefore cannot transmit the loopback frame.

However, the collision decision accelerating means 14 compares the elapsed time from the timing when the information source gave the transmission information to the transmitting means 11 to the timing when the transmission information contained in the aforesaid loopback frame is restored by the receiving means 12 with a threshold value indicating the maximum time of delay allowed with respect to the transmission of the frame modulated by the following transmission information given by the information source and, when the former exceeds the latter, notifies that fact to this information source.

Namely, even in a case where the loopback frame is not given, the source of the transmission information can identify a state where processing such as retransmission should be carried out at a higher speed and with a higher accuracy the smaller the value of the threshold value mentioned above.

b) According to a second aspect of the invention, a full duplex mode may be applied to the transmission path. The threshold value may be set to a time required for transmitting a frame having a maximum width by the transmitting means 11, or to a lesser time.

That is, so far as it is identified that the transmission information is given by the information source, when the sum of the response time of the opposing node via the transmitting means 11, receiving means 12, and transmission path and the transmission delay times of the uplink and downlink of the transmission path is less than the width of the frame, the state where processing such as retransmission should be carried out is identified at a high speed and with a high accuracy in the same way as the above aspect a) even if the counting of the elapsed time from the timing when the information source gave the transmission information to the transmitting means 11 to the timing when the transmission information contained in the loopback frame is restored by the receiving means 12 is not carried out.

c) According to a third aspect of the invention, alternatively, the threshold value may be set equal to or larger than the maximum value of a sum of the response times of the transmitting means 11, receiving means 12, and node and the transmission delay times of an uplink and a downlink of the transmission path.

Accordingly, the state where the processing such as retransmission should be carried out is identified at a high speed and with a high accuracy in the same way as the above aspect a) even in a case where the maximum value of the sum is larger than the width of the frame to be transmitted to the transmission path or a layout of the transmission path interface apparatus according to the present invention or the node opposing to this via this transmission path is changed.

d) According to a fourth aspect a transmission path interface apparatus of the invention, in each of the above, provision may further be made of a delay time measuring means for measuring a length of a period from the timing when the information source gave the transmission information to the transmitting means 11 to the timing when the receiving means 12 restores the transmission information contained in the loopback frame and of a threshold value setting means 22 for setting the threshold value to a value equal to or longer than the length of the period measured by this delay time measuring means 21.

That is, in comparison with the above where the threshold value is set to the intended value in advance, the state where processing such as retransmission should be carried out is identified with a high accuracy without requiring a uselessly long time even in a case where a layout of the transmission path interface apparatus according to the present invention or the node opposing to this via this transmission path is changed.

e) According to a fifth aspect of the invention, the transmitting means 11 may transmit a request for answer compatible with the Internet control message protocol (ICMP) to the transmission path as the frame. The delay time measuring means 21 may measure the length of a period from a timing when the transmission information indicating the request for answer transmitted by the transmitting means 11 is given from the information source to a timing when the transmission information contained in the loopback frame indicating the answer with respect to this request for answer is restored by the receiving means 12.

That is, so long as a PING compatible with the ICMP, a higher protocol of IP, is mounted in the transmitting means 11 and the nodes connected via the transmission path are compatible with the ICMP, a state where processing such as retransmission should be carried out is identified with a high accuracy without special processing for transmission of the specific frame corresponding to the above request for answer and reception of a frame indicating an answer compatible with this specific frame and without requiring a uselessly long time in the same way as the above.

f) According to a sixth aspect of the invention, in each of the above, a DTE/DCE interface mode may be applied between the transmitting means 11, receiving means 12, and collision decision means 13 and the information source. The collision decision accelerating means 14 notifies the information source based on the DTE/DCE interface mode.

That is, notification to the information source that a "state where processing such as retransmission should be carried out" is made under the standard DTE/DCE interface mode without special hardware provided for the notification. Accordingly, application of a variety of information terminals and information apparatuses becomes possible as this information source.

g) According to a seventh aspect of the invention, in each of the above, further, the collision decision accelerating means 14 may notify the information source by sending a jamming signal to the information source.

A "jamming signal" means occurrence of collision in a transmission system compatible with the CSMA mode and is defined as transmission information of a specific format and content. Therefore, irrespective of the interface mode applied between the transmitting means 11, receiving means 12, and collision decision means 13 and the information source, notification that a "state where processing such as retransmission should be carried out" is made to this information source.

h) According to an eighth aspect of the invention, in each of the above, provision may further be made of a transmission controlling means 31 for requesting to that information source that provision of the following transmission information be suspended during a period from the timing when the information source gave the transmission information to the transmitting means 11 to the timing when the transmission information contained in the loopback frame is restored by the receiving means 12.

That is, transmission information following the transmission information contained in the frame transmitted on the transmission path is not given until the timing when a loopback frame corresponding to this frame is received from the node connected via the transmission path, therefore the transmission information to be subsequently transmitted as frames is centrally stored in the information sources of these transmission information.

i) According to a ninth aspect of the invention, the information source may give the transmission information to the transmitting means 11 under a simplex mode. Here, a transmission controlling means 31a may be provided for returning the transmission information to the information source during a period where certain transmission information is given by this information source.

Accordingly, while the information source is giving the transmission information to the transmitting means 11, since the transmission information is returned, it suspends giving transmission information following this to the transmitting means 11 in the above simplex mode.

Namely, a request for sending of the following transmission information should be foregone is transmitted without the transfer of a special handshake signal between the transmitting means 11 and the above information source. Accordingly, flexible standardization of the hardware becomes possible and application of a variety of information terminals and information apparatuses as this information source becomes possible.

j) According to a 10th aspect of the invention, in each of the above, provision may further be made of a memory means 41 in which IDs of the downlink of the transmission path individually allocated for all transmission path interface apparatuses connected with each other via the transmission path are stored in advance and of a loopback means 42 for obtaining the ID corresponding to the identification information contained in the frame from among IDs stored in the memory means 41 when the frame is given via the downlink allocated in advance and transmitting the loopback frame on the uplink corresponding to the downlink indicated by that ID. The transmitting means 11 may obtain the ID stored in the memory means 41 corresponding to the downlink of the destination of the transmission information contained in the transmission information given by the information source among the downlinks of the transmission path and transmits the generated frame to the uplink corresponding to the downlink indicated by that ID.

That is, by individual allocation of downlinks of the transmission path to all transmission interfaces, the probability of occurrence of a collision is dispersed among these downlinks. Also, the frame containing the transmission information is directly transmitted to the downlink allocated to the transmission path interface apparatus to which the transmission information is addressed. Accordingly, an end-to-end communication route is smoothly formed without interposition of a higher node device for performing relaying processing.

Below, a detailed explanation will be given of specific embodiments of the present invention based on the drawings.

Figure 2:
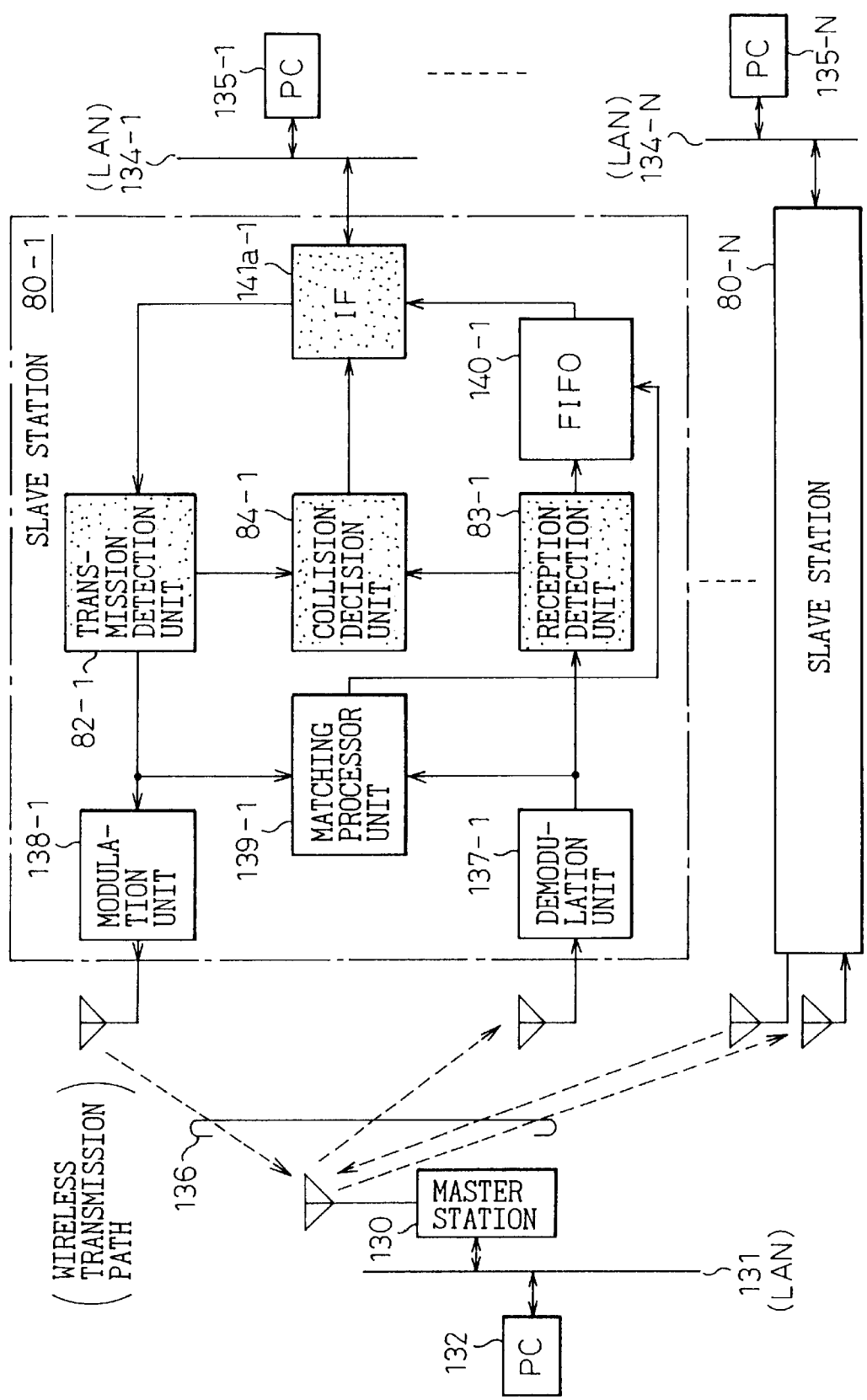
FIG. 2 is a view of a first embodiment according to the present invention.

FIG. 2 is a view of a first embodiment corresponding to the first, second, and ninth aspects of the invention.

In the figure, the same functions and configurations as those shown in FIG. 7 are given the same reference numerals and explanations thereof are omitted.

The difference in configuration between the present embodiment and the related art shown in FIG. 7 resides in the configuration of slave stations 80-1 to 80-N provided in place of the slave stations 133-1 to 133-N.

Further, the difference in configuration between the slave station 80-1 and the slave station 133-1 resides in the points that (1) an interface unit (IF) 141a-1 is provided in place of the interface unit 141-1, (2) a transmission detection unit 82-1 is arranged between the interface unit 141a-1 and the modulation unit 138-1 and matching processor unit-139-1, (3) a reception detection unit 83-1 is arranged between the demodulation unit 137-1 and the FIFO 140-1, (4) a collision decision unit 84-1 is connected to the outputs of-these transmission detection unit 82-1 and reception detection unit 83-1, and (5) the output of the collision decision unit 84-1 is connected to the corresponding input of the interface unit 141a-1.

Note that the configuration of the slave stations 80-2 to 80-N is the same as the configuration of the slave station 80-1, therefore the same reference numerals with "2" to "N" as suffixes are given to corresponding constituent elements and overlapping explanations and illustrations are omitted.

Further, the correspondence between the present embodiment and the block diagram shown in FIG. 1 is as follows: (1) the interface unit 141a-1, transmission detection unit 82-1 and modulation unit 138-1 correspond to the transmitting means 11, memory means 41, and loopback means 42; (2) the demodulation unit 137-1 and the reception detection unit 83-1 correspond to the receiving means 12; (3) the matching processor unit 139-1 corresponds to the collision decision means 13; and (4) the transmission detection unit 82-1, the reception detection unit 83-1, the collision decision unit 84-1, and the interface unit 141a-1 correspond to the collision decision accelerating means 14.

Below, the operation of the present embodiment will be explained.

In the slave station 80-1, the transmission detection unit 82-1 gives the transmission information and the identification information given from the personal computer 135-1 via the LAN 134-1 and the interface unit 141a-1 to the modulation unit 138-1. In parallel with this, the period during which these transmission information and the identification information are given (hereinafter referred to as the "transmission period") is notified to the collision decision unit 84-1.

Further, the demodulation unit 137-1 demodulates the loopback signal received from the master station 130 via the downlink of the wireless transmission path 136 to generate the baseband signal. The reception detection unit 83-1 analyzes the baseband signal to restore the transmission information and the identification information which it then gives to the FIFO 140-1. At the same time, it notifies the collision decision unit 84-1 of the period during which these transmission information and the identification information are given from the demodulation unit 137-1 (hereinafter, referred to as "reception period").

The collision decision unit 84-1 decides whether or not the above transmission period is earlier on the time axis and the transmission period and the reception period thereof are different.

The collision decision unit 84-1 does not perform any special processing when the result of such a decision is "true". However, conversely, where the result of this decision is "false", it notifies the interface unit 141a-1 of that fault.

When recognizing the notification, the interface unit 141a-1 notifies the personal computer 135-1 of the fact that "the loopback signal was received earlier than the completion of the transmission" via a specific signal line formed with the personal computer 135-1 via the LAN 134-1 and provided for the handshake between the two.

Namely, even when a plurality of slave stations transmit wireless packets in parallel to the uplink of the wireless transmission path 136 and the master station 130 cannot transmit loopback signals since it cannot receive the wireless preambles contained in any of these wireless packets, the slave stations 80-1 to 80-N each decide whether or not the loopback signal is received prior to when the transmission of the wireless packet which each station sends is completed. Further, they notify the results of these decisions to the personal computers 135-1 to 135-N which send the identification information-and the transmission information contained in the corresponding wireless packets.

Accordingly, according to the present embodiment, the personal computers 135-1 to 135-N can perform the retransmission and other suitable processings at an early stage and with a high accuracy based on the results of the decisions without waiting over the interval T under the count of the timers activated at the time of transmission.

Figure 3:
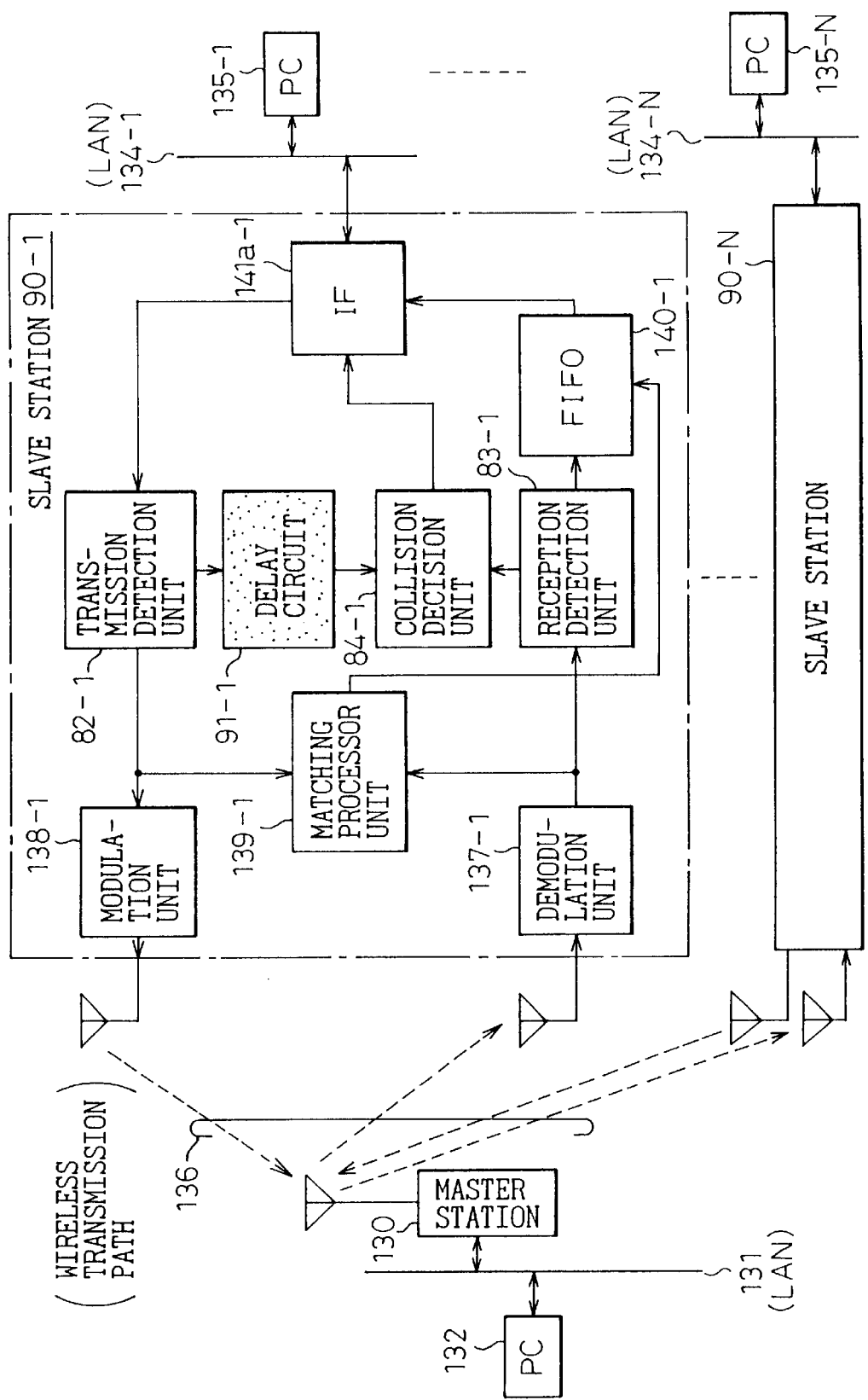
FIG. 3 is a view of a second embodiment according to the present invention.

FIG. 3 is a view of a second embodiment corresponding to the third aspect of the present invention.

In the figure, the same functions and configurations as those shown in FIG. 2 are given the same reference numerals and overlapping explanations are omitted.

The difference in configuration between the present embodiment and the block diagram shown in FIG. 2 resides in the configuration of the slave stations 90-1 to 90-N provided in place of the slave stations 80-1 to 80-N.

Further, the difference in configuration between the slave station 90-1 and the slave station 80-1 resides in the point that a delay circuit 91-1 is arranged between the transmission detection unit 82-1 and the collision decision unit 84-1.

Note that the configuration of the slave stations 90-2 to 90-N is the same as the configuration of the slave station 90-1, therefore corresponding constituent elements will be indicated by the same reference numerals with "2" to "N" as suffixes, and overlapping explanations and illustrations thereof will be omitted.

Note that the correspondence between the present embodiment and the block diagram shown in FIG. 1 is the same as the correspondence in the embodiment shown in FIG. 2 except that the delay circuit 91-1 corresponds to the collision decision accelerating means 14 as well as the transmission detection unit 82-1, reception detection unit 83-1 and collision decision unit 84-1.

Below, the operation of the present embodiment will be explained.

The delay circuit 91-1 is set in advance with a delay time td equal to the sum of a time required for processing by the modulation unit 138-1 for generating the wireless packet in accordance with the given transmission information and identification information and processing by the demodulation unit 137-1 for demodulating the loopback signal so as to generate the baseband signal and for restoring the transmission information and the identification information contained in the baseband signal and propagation delay times of the uplink and downlink of the wireless transmission path 136.

Further, the delay circuit 91-1 notifies the reception period notified by the transmission detection unit 82-1 to the collision decision unit 84-1 while delaying this over the delay time td mentioned above.

Note that the operation of portions other than the delay circuit 91-1 is similar to the operation in the above embodiment, therefore the explanation is omitted here.

Accordingly, according to the present embodiment, even when the amount of processing to be carried out by the modulation unit 138-1 and the demodulation unit 137-1 is so large that the sum of the above times does not appear smaller than the width of the wireless packet, when an improvement of response of these modulation unit 138-1 and demodulation unit 137-1 is prevented due to cost or other restrictions, or when the maximum length of the wireless transmission path 136 is large, the slave stations 90-1 to 90-N can detect the fact that "the master station 130 could not transmit a loopback signal for the wireless packet which that station sent" at an early stage in the same way as the embodiment shown in FIG. 2.

Figure 4:
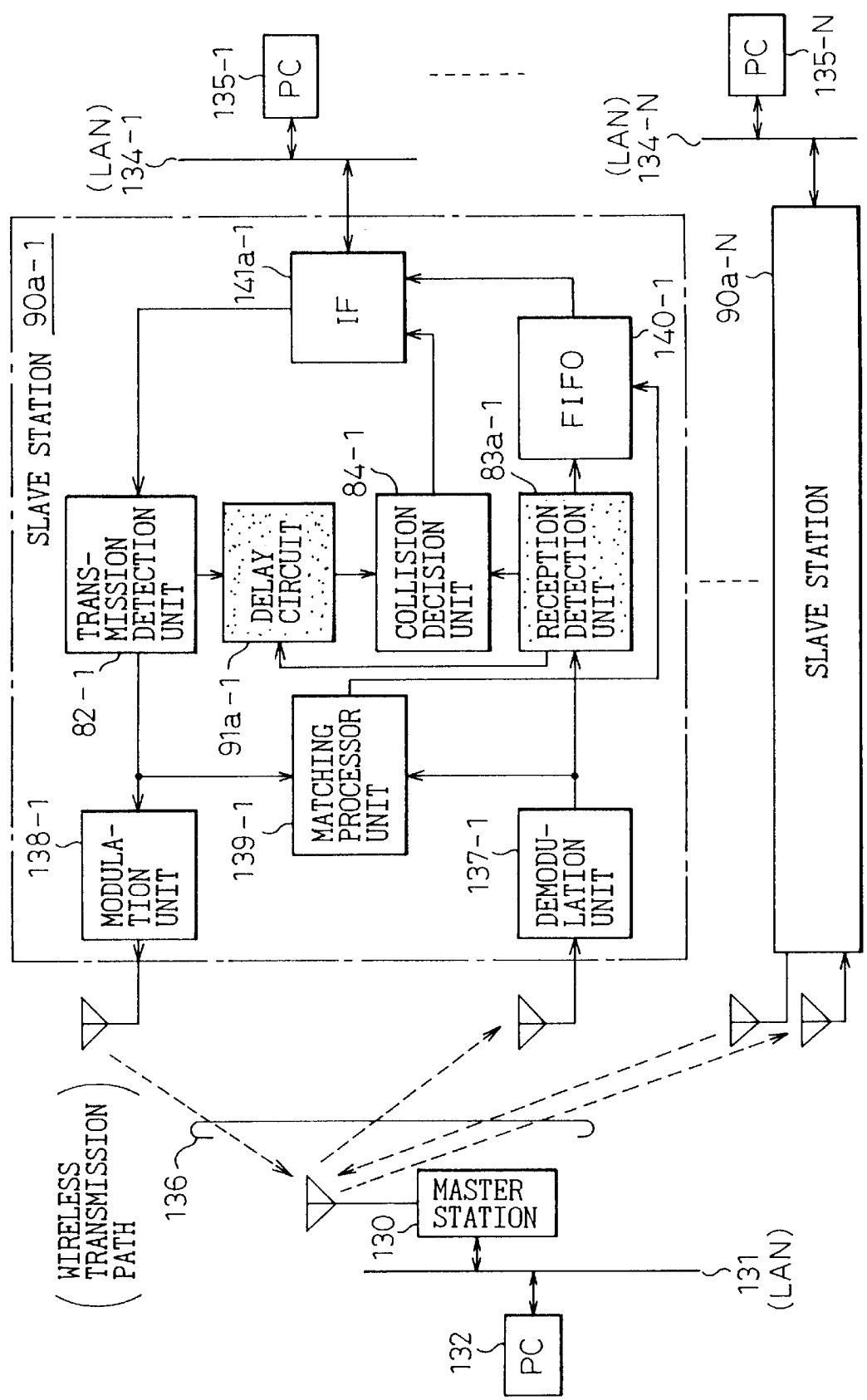
FIG. 4 is a view of a third embodiment according to the present invention.

FIG. 4 is a view of a third embodiment corresponding to the fourth and fifth aspects of the present invention.

In the figure, the same functions and configurations as those shown in FIG. 3 are given the same reference numerals and overlapping explanations thereof are omitted.

The difference in configuration between the present embodiment and the embodiment shown in FIG. 3 resides in the configuration of the slave stations 90a-1 to 90a-N provided in place of the slave stations 90-1 to 90a-N.

Further, the difference in configuration between the slave station 90-1 and the slave station 90a-1 resides in the point that (1) the delay circuit 91a-1 is provided in place of the delay circuit 91-1, (2) a reception detection unit 83a-1 is provided in place of the reception detection unit 83-1, and (3) a corresponding output of the reception detection unit 83-1 is connected to a control terminal of the delay circuit 91a-1.

Note that, the configuration of the slave stations 90a-2 to 90a-N is the same as the configuration of the slave station 90a-1, therefore corresponding constituent elements will be indicated by the same reference numerals with "2" to "N" as suffixes and overlapping explanations and illustrations thereof are omitted.

Further, the correspondence between the present embodiment and the block diagram shown in FIG. 1 is the same as the correspondence in the embodiments shown in FIG. 2 and FIG. 3 except that the reception detection unit 83a-1 corresponds to the delay time measuring means 21 and the threshold value setting means 22.

Below, the operation of the present embodiment will be explained.

The personal computer 135-1 discriminates timings set, at predetermined frequencies, at the time of startup. At these timings, it transmits the specific transmission information and the identification information (here, for simplification, it is assumed to be the information indicating "request for answer" compatible with the ICMP) to the slave station 90*a*-1 via the LAN 134-1.

In the slave station 90*a*-1, the transmission detection unit 82-1 gives the specific transmission information and identification information to the modulation unit 138-1 and then, similar to the embodiment shown in FIG. 2, notifies the transmission period to the collision decision unit 84-1 via the delay circuit 91*a*-1. When the transmission period is given according to these specific transmission information and identification information, a "measurement instruction" indicating this fact is given to the delay circuit 91*a*-1.

On the other hand, the master station 130 transmits a loopback signal, corresponding to the "answer", to the downlink of the wireless transmission path 136 based on a protocol compatible with the ICMP when recognizing the wireless packet (indicating above "request for answer") transmitted to the uplink of the wireless transmission path 136 by the modulation unit 138-1 according to the specific transmission information and identification information.

Further, in the slave station 90*a*-1, the demodulation unit 137-1 demodulates the loopback signal received via the downlink of the wireless transmission path 136 from the master station 130 so as to generate the baseband signal, while the reception detection unit 83*a*-1 analyzes the baseband signal so as to restore the transmission information and the identification information contained in this loopback signal and gives the same to the FIFO 140-1. Further, it decides whether or not these transmission information and identification information correspond to the specific transmission information and identification information mentioned above.

The reception detection unit 83*a*-1 does not perform any special processing when the result of this decision is "false". Conversely, when this result-is "true", it gives a "turn-around-notification" indicating "true" to the delay circuit 91*a*-1.

The delay circuit 91*a*-1 is set in advance with the default value tD of the delay time. Further, by counting the length ta of the period from the timing when the "measurement indication" is given to the timing when the "turn-around notification" is given, the delay time is updated to the sum of this length ta of this period and the default value tD.

Note that, when the above "measurement instruction" is not given, by applying a delay time set in advance or an updated delay time, the delay circuit 91*a*-1 performs similar processing to that of the delay circuit 91-1 in the second embodiment.

Namely, the delay time of the delay circuit 91*a*-1 is automatically set to a value equal to or larger than the turn-around time ta actually elapsed as the time required for the operation or propagation delay times in the modulation unit 138-1 uplink of the wireless transmission path 136, master station 130, the downlink of the wireless transmission path 136, and the demodulation unit 137-1.

Accordingly, according to the present embodiment, for example, even when the transmission characteristics of the wireless transmission path 136 vary due to a change of layout of all or part of the slave stations 90*a*-1 to 90*a*-N and master station 130 or due to a change of the environment in which the wireless LAN to which the invention of the present application is applied is disposed, the wireless transmission path 136 is flexibly formed between these slave stations 90*a*-1 to 90*a*-N and the master station 130.

Note that, in the present embodiment, the turn-around time ta is measured by making the master station 130 compatible with the "request for answer" compatible with the ICMP. However, if the turn-around time ta could be similarly measured with a high accuracy by cooperation of the master station 130 and the slave stations 90*a*-1 to 90*a*-N, the wireless packet could be any format depending upon the identification information and the transmission information contained in the wireless packet corresponding to this "request for answer".

Further, in the present embodiment, the master station 130 does not always normally receive the "request for answer" or the wireless packet corresponding to the "request for answer" due to some wireless packets being transmitted in parallel from other slave stations to the uplink of the wireless transmission path 136.

However, processing such as retransmission based on a predetermined communication protocol is possible for the above specific transmission information and identification information under the control of the personal computer 135-1 in the same way as the usual transmission information and identification information. Further, the delay circuit 91*a*-1 can validate only the newest among a plurality of "measurement instructions" given in the process of communication processing based on such a communication protocol.

Accordingly, an explanation of the detailed operation when a wireless packet corresponding to the "request for answer" is not normally received by the master station 130 is omitted.

Figure 5:
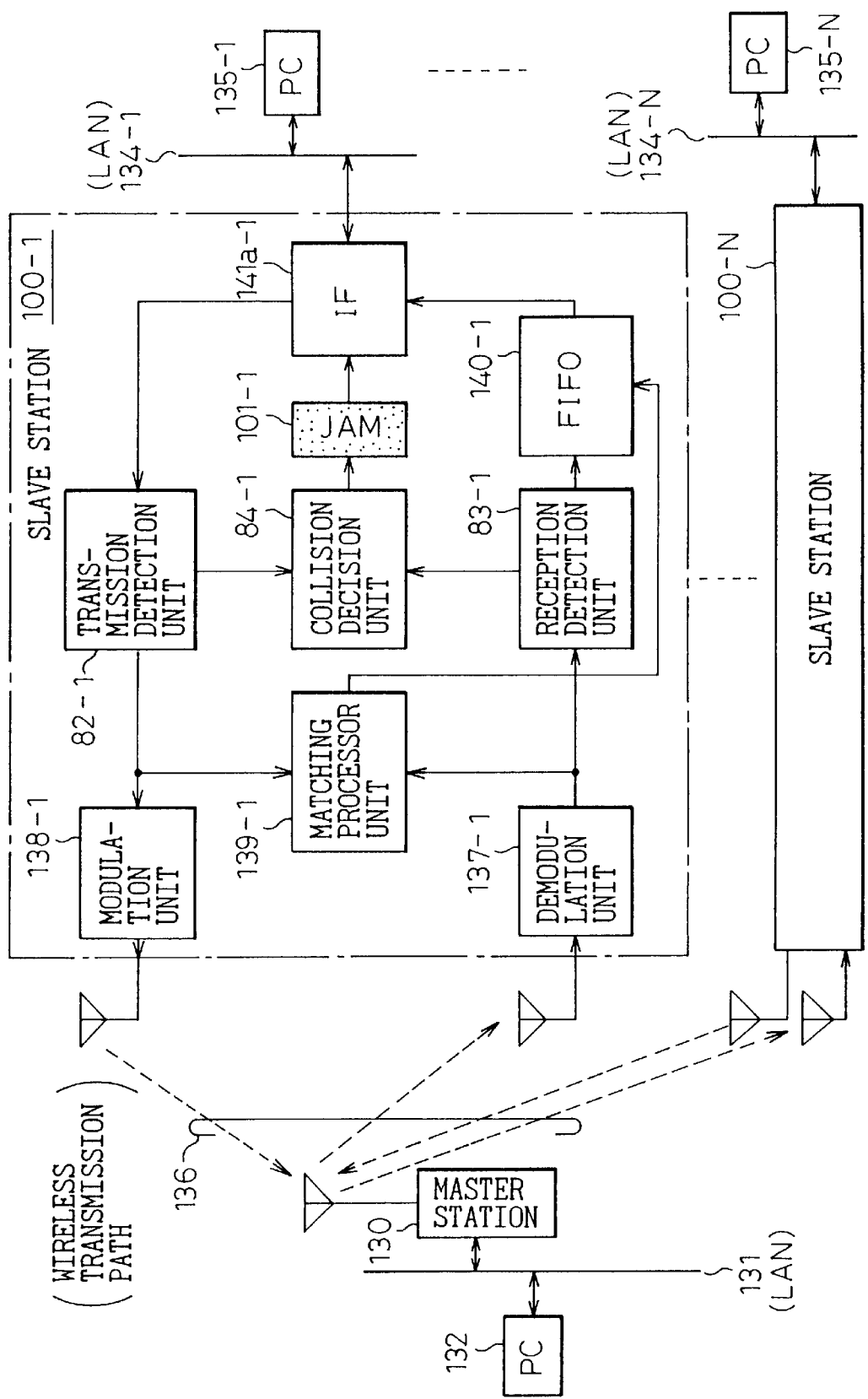
FIG. 5 is a view of a fourth embodiment according to the present invention.

FIG. 5 is a view of a fourth embodiment corresponding to the sixth and seventh aspects of the present invention.

In the figure, the same functions and configurations as those shown in FIG. 2 are given the same reference numerals and overlapping explanations are omitted.

The difference in configuration between the present embodiment and the embodiment shown in FIG. 2 resides in the configuration of the slave stations 100-1 to 100-N provided in place of the slave stations 80-1 to 80-N.

Further, the difference in configuration between the slave station 100-1 and the slave station 80-1 resides in the point that a jamming signal generating unit (JAM) 101-1 is provided between the collision decision unit 84-1 and the interface unit 141*a*-1.

Note that the configuration of the slave stations 100-2 to 100-N is the same as the configuration of the slave station 100-1, therefore corresponding constituent elements will be indicated by the same reference numerals with "2" to "N" as suffixes and overlapping explanations and illustrations thereof are omitted.

Further, the correspondence between the present embodiment and the block diagram shown in FIG. 1 is the same as the correspondence in the embodiments shown in FIG. 2 to FIG. 4 except that the jamming signal generating unit 101-1 corresponds to the collision decision accelerating means 14.

Below, the operation of the present embodiment will be explained.

The collision decision unit 84-1 decides "whether or not the transmission period is earlier and the reception period has been notified from the reception detection unit 83-1 (83*a*-1) during the transmission period" in the same way as the first to third embodiments and gives a binary signal indicating the result of this decision to the jamming signal generating unit 101-1.

The jamming signal generating unit 101-1 does not perform any processing when the result of the decision indicated by the binary signal is "true". Conversely, when the result of the decision is "false", it transmits the jamming signal to the personal computer 135-1 via the interface unit 141a-1 and LAN 134-1.

Such a jamming signal generally indicates that collision has occurred (in actuality occurs on the uplink of the wireless transmission path 136) in the transmission system of the CSMA/CD mode, therefore the personal computer 135-1 suspends the transmission of the following transmission information and identification information based on a communication protocol and algorithm determined in advance in response to this jamming signal.

In this way, according to the present embodiment, when the signal line to be provided for the handshake is not used and the jamming signal to be provided for the control of the communication protocol is given to corresponding personal computers 135-1 to 135-N from the slave stations 100-1 to 100-N, these personal computers 135-1 to 135-N can identify the occurrence of a collision occurring on the uplink of the wireless transmission path 136 according to the jamming signal with a high accuracy, then suitably can control the communication in a manner compatible with the occurrence of the collision.

Accordingly, in the present embodiment, in comparison with above embodiments, the restrictions on the configuration of the hardware for realizing the communication interface between the slave stations 100-1 to 100-N and the personal computers 135-1 to 135-N are eased.

Note that, in the present embodiment, notification of the occurrence of a collision is given to the personal a computer 135-1 as the jamming signal, but if the personal computer 135-1 can reliably recognize it in accordance with the transmission mode of the LAN 134-1 to 134-N, control information of any format (for example, control packet or control cell) can be used in place of the jamming signal.

Figure 6:
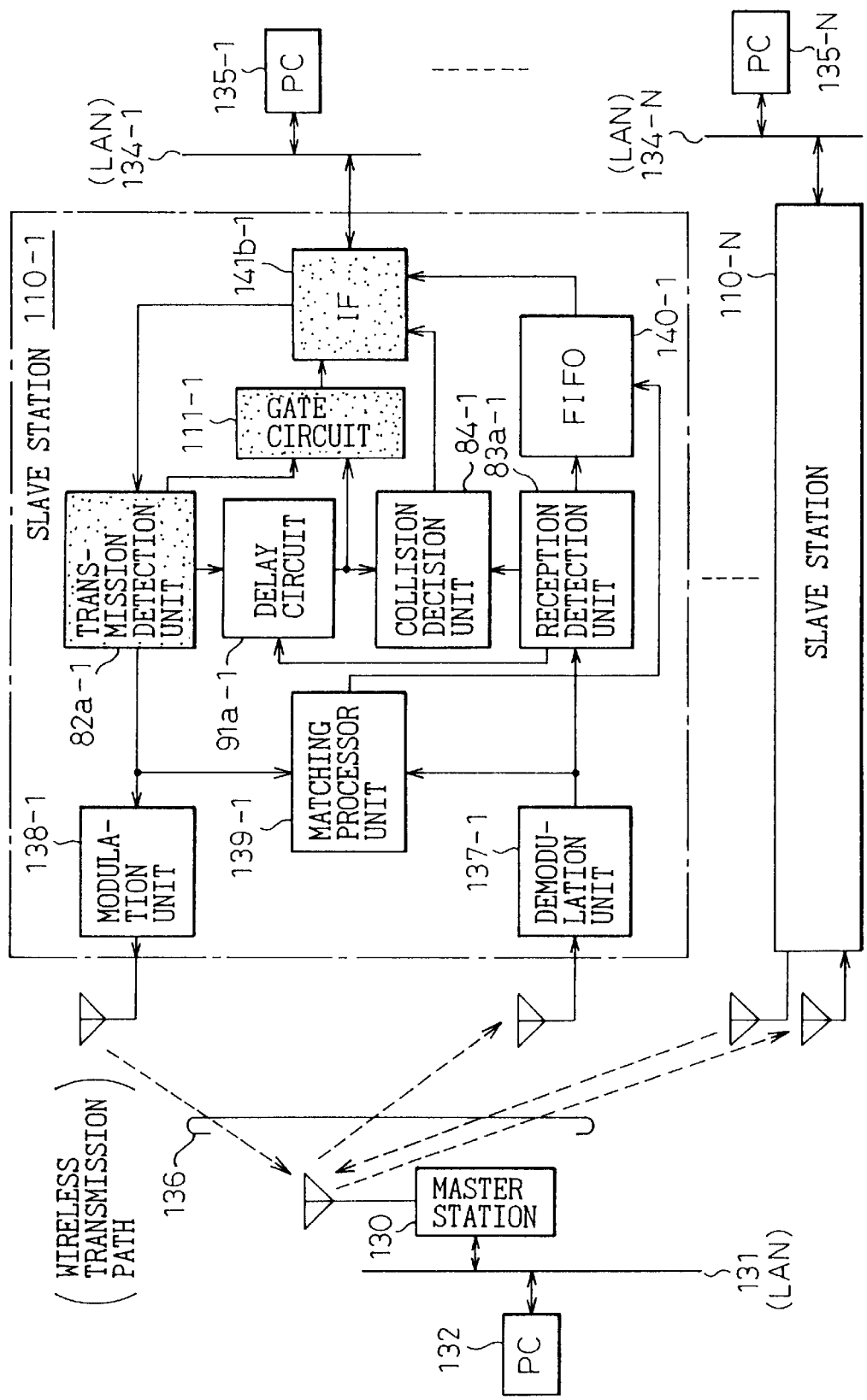
FIG. 6 is a view of a fifth embodiment according to the present invention.

FIG. 6 is a view of a fifth embodiment corresponding to the eighth and ninth aspects of the present invention.

In the figure, the same functions and configurations as those shown in FIG. 4 are given the same reference numerals and overlapping explanations are omitted.

The difference in configuration between the present embodiment and the embodiment shown in FIG. 3 resides in the configuration of the slave stations 110-1 to 110-N provided in place of the slave stations 90a-1 to 90a-N.

Further, the difference in configuration between the slave station 110-1 and the slave station 90a-1 resides in the points that (1) an interface unit 141b-1 is provided in place of the interface unit 141a-1, (2) a transmission detection unit 82a-1 is provided in place of the transmission detection unit 82-1, (3) a specific output of the transmission detection unit 82a-1 and the output of the delay circuit 91-1 are connected to corresponding inputs of a gate circuit 111-1, and (4) the output of the gate circuit 111-1 is connected to the corresponding input of the interface unit 141b together with the output of the collision decision unit 84-1.

Note that the configuration of the slave stations 110-2 to 110-N is the same as the configuration of the slave station 110-1, therefore corresponding constituent elements will be indicated by the same reference numerals with "2" to "N" as suffixes and overlapping explanations and illustrations will be omitted.

Further, the correspondence between the present embodiment and the block diagram shown in FIG. 1 is the same as the correspondence in the embodiments shown in FIG. 2 to FIG. 5 except that the gate circuit 111-1 corresponds to the transmission controlling means 31 and 31a.

Below, the operation of the present embodiment will be explained.

The personal computer 135-1 gives the intended transmission information and the identification information indicating the destination of the transmission information (may be one indicating "request for answer" mentioned above too) to the slave station 90-1 via the LAN 134-1 in the same way as the embodiments shown in FIG. 2 and FIG. 3.

In the slave station 110-1, the transmission detection unit 82a-1 gives the transmission information and identification information to the modulation unit 138-1 and the gate circuit 111-1 in parallel, and then, similar to the first and second embodiments, notifies the transmission period to the delay circuit 91a-1. If the transmission period is given in accordance with the specific transmission information and identification information, it gives a "measurement instruction" indicating this to the delay circuit 91a-1.

On the other hand, the master station 130 transmits a loopback signal to the downlink of the wireless transmission path 136 when recognizing the wireless packet (may be one indicating "request for answer" mentioned above too) transmitted to the uplink of the wireless transmission path 136 by the modulation unit 138-1 in accordance with these specific transmission information and identification information.

Further, in the slave station 110-1, the demodulation unit 137-1 demodulates the received loopback signal via the downlink of the wireless transmission path 136 from the master station 130 to generate the baseband signal, while the reception detection unit 83a-1 analyzes the baseband signal so as to restore the transmission information and the identification information contained in this loopback signal and gives the same to the FIFO 140-1. Further, the reception detection unit 83a-1 decides whether or not these transmission information and identification information correspond to the specific transmission information and identification information.

The reception detection unit 83a-1 does not perform any special processing when the result of this decision is "false", but conversely, gives a "turn-around notification" to the delay circuit 91a-1 when the result is "true".

The delay circuit 91a-1 is set in advance with the default value tD of the delay time. Further, the gate circuit 111-1 is opened only during the period from the timing when the transmission period is notified ("measurement instruction" is given) to the timing when the reception period is notified ("turn-around notification" is given) and the period not corresponding to the transmission period. When the "turn-around notification" is given, the length ta of the period is counted, and the delay time is updated to the sum of the length ta of this period and the default value tD.

The gate circuit 111-1 returns the transmission information and the identification information given from the personal computer 135-1 to the personal computer 135-1 via the interface unit 141b-1 and the LAN 134-1 in the period during which the gate circuit 111-1 is opened as mentioned above.

The personal computer 135-1 suspends the transmission of the following transmission information and the identification information indicating the destination of the transmission information during the period in which certain information is returned to it via the downlink of the path formed in the LAN 134-1.

In this way, according to the present embodiment, the personal computer transmitting some transmission information and the identification information indicating the destination of the transmission information suspends the transmission of the following transmission information and the identification information indicating the destination of the transmission information during the period among the transmission periods in which the loopback signal corresponding to the wireless packet containing these transmission information and identification information is received from the master station 130 via the wireless transmission path 136.

Accordingly, even when the amount of the transmission information to be transmitted is enormous, it is possible to avoid useless provision to the modulation unit 138-1 of a large amount of transmission information and identification information to be transmitted following the transmission information and the identification information which might be retransmitted. Further, it is not necessary to mount a large scale memory for storing such a large amount of transmission information and identification information in the modulation unit 138-1 or before it.

Note that, in the present embodiment, the transmission information and the identification information transmitted by the personal computer 135-1 are returned to the personal computer 135-1, but the restriction on the personal computer 135-1 transmitting the following transmission information and identification information is realized by for example one or both of hardware and software. Alternatively, it is also possible to realize this restriction by a handshake performed via the LAN 134-1.

Further, in the above embodiments, the wireless transmission path 136 is formed as the uplink provided exclusively for transmission by the master station and the downlink shared by the plurality of slave stations.

However, by individual allocation of unique links to these slave stations and the addition of means for enabling transmission of the wireless packet (containing the loopback signal to be transmitted in place of the master station 130) to the link allocated to the intended destination among these links, it is possible to reduce the probability of collision in these links. In this case, it is also possible to form the communication path among slave stations without going through the master station 130.

Further, where unique downlinks are allocated for every slave station in this way, it is possible to adopt a configuration in which transmissions with respect to a plurality of downlinks are carried out in parallel and to transmit a wireless packet which a station itself sends and a wireless packet which is to be relayed to another slave station in parallel together with the loopback signal. By this, the transmission efficiency is enhanced.

Further, in the above embodiments, the transmission information and the identification information stored in the FIFOs 140-1 to 140-N and the transmission information and the identification information received as loopback signals were discarded under the control of the collision decision units 84-1 to 84-N. However, it is also possible to perform the processing for this under the control of the personal computers 135-1 to 135-N.

Further, in the above embodiments, the slave stations 80-1 to 80-N, 90-1 to 90-N, 90a-1 to 90a-N, 100-1 to 100-N, and 110-1 to 110-N were connected to the personal computers 135-1 to 135-N via the LAN 134-1 to 134-N. However, the invention is not restricted to such a configuration. It is also possible to connect these slave stations 80-1 to 80-N, 90-1 to 90-N, 90a-1 to 90a-N, 100-1 to 100-N, and 110-1 to 110-N to corresponding communication ports of the personal computers 135-1 to 135-N.

Further, in. the above embodiments, the slave stations 80-1 to 80-N, 90-1 to 90-N, 90a-1 to 90a-N, 100-1 to 100-N, and 110-1 to 110-N constitute nodes of the wireless LAN together with the personal computers 135-1 to 135-N. However, if the transmission information is divided into frames, packets, cells, and other transmission units which are given preambles and then logically multiplexed and transmitted, the present invention can be similarly applied to an optical transmission system and a cable transmission system.

Further, in the above embodiments, the present invention was applied to a wireless LAN compatible with the CSMA/CD mode, but if there is a possibility that when a collision occurs in the transmission path, the preamble will not be received at the opposing node via the transmission path and therefore the loopback signal will not be received, the present invention can be similarly applied to the CSMA mode in which transmission is not interrupted even at occurrence of collision.

Further, in the above embodiments, the personal computers 135-1 to 135-N connected via the LANs 134-1 to 134-N were shown as the information sources giving the transmission information to be transmitted as the wireless packets and the identification information indicating the destination of the transmission information. However, in the present invention, it is possible to use any information terminal or information apparatus in place-of these personal computers 135-1 to 135-N.

Further, in the above embodiments, after the loopback signal received from the wireless transmission path 136 and the transmission information and the identification information contained in the wireless packet are stored in the FIFOs 140-1 to 140-N, they are suitably transmitted to the personal computers 135-1 to 135-N or discarded. However, where it is certain that "the following wireless packet is not received before the processing concerning the earlier received wireless packet via the downlink of this wireless transmission path 136 is definitely completed", even if collision occurs in the uplink of the wireless transmission path 136, it is also possible to use simple memory circuits in place of these FIFOs 140-1 to 140-N.

Further, in the above embodiments, the reception of the wireless packets given via the downlinks of the wireless transmission path 136 is carried out by the slave stations 80-1 to 80-N, 90-1 to 90-N, 90a-1 to 90a-N, 100-1 to 100-N, and 110-1 to 110-N together with the transmission to uplinks of the wireless transmission path 136. However, it is also possible not to perform the processing for giving the transmission information and the identification information contained in the received wireless packet (containing loopback signal) to the personal computer for slave stations connected to personal computers (information terminals) which should just become transmitting end among these slave stations 80-1 to.80-N, 90-1 to 90-N, 90a-1 to 90a-N, 100-1 to 100-N and 110-1 to 110-N.

Further, in the above embodiments, the wireless packet generated by the modulation of the carrier signal according to the preamble, the transmission information, and the identification information is transmitted to the wireless transmission path 136. However, if there is a possibility that the loopback signal will not be received due to the occurrence of collision in the part indicating the preamble among frames transmitted to the transmission path, the present invention can be similarly applied to a transmission system adopting the baseband transmission mode.

As explained above, with the first aspect of the invention, even in a case where the loopback frame is not received from the node connected via the transmission path, the information source of the transmission information transmitted earlier as a frame can identify the state where processing such as retransmission should be carried out at a high speed and with a high accuracy.

Further, with the second aspect of the invention, even if the time elapsed prior to the period from the timing when the transmission information transmitted earlier as a frame to the transmission path is given from the information source to the timing when the transmission information contained in the loopback frame is restored is not counted, in the same way as the first aspect, the identification of state where processing such as retransmission should be carried out is carried out at a high speed and with a high accuracy.

Further, with the third aspect of the invention, even in a case where the maximum value of the sum of the response time of the transmitting means, receiving means, and node and transmission delay times of the uplink and downlink of the transmission path is remarkably larger than the width of the frame which should be transmitted to the transmission path or a case where the layout of the transmission path interface apparatus and nodes connected via this transmission path may be changed, in the same way as the first and second aspects of the invention, the identification of the state where processing such as retransmission should be carried out is carried out at a high speed and with a high accuracy.

Further, with the fourth aspect of the invention, even in a case where the layout of the transmission path interface apparatus according to the present invention and the nodes connected via the transmission path are changed, the identification of the state where processing such as retransmission should be carried out is carried out with a high accuracy without a uselessly long time in comparison with that of the first to third aspects of the invention.

Further, with the fifth aspect of the invention, so long as a PING compatible with the ICMP, a higher protocol of the IP, is mounted in the transmitting means and the nodes connected via the transmission path are compatible with the ICMP, in the same way as the fourth aspect of the invention, a state where processing such as retransmission should be carried out is identified with a high accuracy without special processing for transmission of the specific frame corresponding to the above request, for answer and reception of a frame indicating an answer compatible with this specific frame and without requiring a uselessly long time.

Further, with the sixth aspect of the invention, the information source of the transmission information transmitted earlier as a frame is notified of "the state where processing such as retransmission should be carried out" under the standard DTE/DCE interface mode. Accordingly, it becomes possible to use a variety of information terminals and information apparatuses as this information source.

Further, with the seventh aspect of the invention, no matter what the format of the interface adopted between the transmitting means, receiving means, and collision decision means and the information source, the information source is reliably notified of the "state where processing such as retransmission should be carried out".

Further, with the eighth aspect of the invention, transmission information which should be subsequently transmitted as the frame is centrally stored in the information sources of the transmission information.

Further, with the ninth aspect of the invention, in addition to flexible standardization of hardware, it becomes possible to use a variety of information terminals and information apparatuses as the information source.

Further, with the 10th aspect of the invention, an end-to-end communication route is smoothly formed without interposition of a higher node device for the relaying.

Accordingly, in the transmission system to which these configurations are applied, efficient control of communication which can use a variety of communication means and communication modes, can be flexibly adapted to the configuration of the hardware and software, and can handle the occurrence of collision becomes possible.

What is claimed is:

1. A transmission path interface apparatus provided with:
   a transmitting means for holding transmission information given as a serial bit train, generating a frame modulated by a preamble together with that transmission information, and transmitting this frame to a transmission path compatible with a CSMA mode;
   a receiving means for taking out a loopback frame which is being transmitted by an opposing node via said transmission path in response to a frame which the transmitting means transmitted, restoring the transmission information contained in this loopback frame, and holding the same;
   a collision decision means for determining a correlation between transmission information individually held by the transmitting means and the receiving means and notifying a result of this correlation to an information source of the transmission information contained in the frame generated by the transmitting means; and
   a collision decision accelerating means for comparing an elapsed time from a timing when the information source gave the transmission information to the transmitting means to a timing when the transmission information contained in the loopback frame is restored by the receiving means and a threshold value indicating the maximum delay time allowed with respect to the transmission of the frame modulated by the following transmission information and notifying the fact that the former exceeds the latter to this information source when the former exceeds the latter.

2. A transmission path interface apparatus as set forth in claim 1, wherein:
   a full duplex mode is applied to said transmission path and the threshold value is set to a time no greater than the time required for transmitting a frame having a maximum width by the transmitting means.

3. A transmission path interface apparatus as set forth in claim 1, wherein the threshold value is set equal to or larger than the maximum value of a sum of response times of the transmitting means, receiving means, and node and the transmission delay times of an uplink and a downlink of the transmission path.

4. A transmission path interface apparatus as set forth in claim 1, further provided with:
   a delay time measuring means for measuring a length of a period from the timing when the information source gave the transmission information to the transmitting means to the timing when the receiving means restores the transmission information contained in the loopback frame and
   a threshold value setting means for setting the threshold value to a value equal to or longer than the length of the period measured by this delay time measuring means.

5. A transmission path interface apparatus as set forth in claim 3, further provided with:
   a delay time measuring means for measuring a length of a period from the timing when the information source gave the transmission information to the transmitting means to the timing when the receiving means restores the transmission information contained in the loopback frame and
   a threshold value setting means for setting the threshold value to a value equal to or longer than the length of the period measured by this delay time measuring means.

6. A transmission path interface apparatus as set forth in claim 4, wherein:

the transmitting means transmits a request for answer compatible with the Internet control message protocol (ICMP) to the transmission path as the frame and the delay time measuring means measures the length of a period from a timing when the transmission information indicating the request for answer transmitted by the transmitting means is given from the information source to a timing when the transmission information contained in the loopback frame indicating the answer with respect to this request for answer is restored by the receiving means.

7. A transmission path interface apparatus as set forth in claim 5, wherein:

the transmitting means transmits a request for answer compatible with the Internet control message protocol (ICMP) to the transmission path as the frame and the delay time measuring means measures the length of a period from a timing when the transmission information indicating the request for answer transmitted by the transmitting means is given from the information source to a timing when the transmission information contained in the loopback frame indicating the answer with respect to this request for answer is restored by the receiving means.

8. A transmission path interface apparatus as set forth in claim 1, wherein:

a DTE/DCE interface mode is applied between the transmitting means, receiving means, and collision decision means and the information source and the collision decision accelerating means notifies the information source based on the DTE/DCE interface mode.

9. A transmission path interface apparatus as set forth in claim 1, wherein the collision decision accelerating means notifies the information source by sending a jamming signal to the information source.

10. A transmission path interface apparatus as set forth in claim 1, further provided with a transmission controlling means for requesting to that information source that provision of the following transmission information be suspended during a period from the timing when the information source gave the transmission information to the transmitting means to the timing when the transmission information contained in the loopback frame is restored by the receiving means.

11. A transmission path interface apparatus as set forth in claim 2, wherein:

the information source gives the transmission information to the transmitting means under a simplex mode and further provision is made of a transmission controlling means for returning the transmission information to the information source during a period where certain transmission information is given by this information source.

12. A transmission path interface apparatus as set forth in claim 1, wherein:

further provision is made of a memory means in which IDs of the downlink of the transmission path individually allocated for all transmission path apparatuses connected with each other via the transmission path are stored in advance and a loopback means for obtaining the ID corresponding to identification information contained in the frame from among the IDs stored in the memory means when the frame is given via the downlink allocated in advance and transmitting the loopback frame on the uplink corresponding to the downlink indicted by that ID and the transmitting means obtains the ID stored in the memory means corresponding to the destination of the transmission information contained in the transmission information given by the information source among the downlinks of the transmission path and transmits the generated frame to the uplink corresponding to the downlink indicated by that ID.

\* \* \* \* \*